(12) United States Patent
Ying et al.

(10) Patent No.: US 8,450,105 B2
(45) Date of Patent: May 28, 2013

(54) MECHANICALLY REVERSIBLE GEL

(75) Inventors: Jackie Y. Ying, Singapore (SG); Shona Pek, Singapore (SG); Andrew C A Wan, Singapore (SG)

(73) Assignee: Agency for Science, Technology and Research, Connexis (SG)

( * ) Notice: Subject to any disclaimer, the term of this patent is extended or adjusted under 35 U.S.C. 154(b) by 961 days.

(21) Appl. No.: 12/299,199

(22) PCT Filed: May 4, 2007

(86) PCT No.: PCT/SG2007/000127
§ 371 (c)(1),
(2), (4) Date: Feb. 4, 2009

(87) PCT Pub. No.: WO2007/129991
PCT Pub. Date: Nov. 15, 2007

(65) Prior Publication Data
US 2009/0305412 A1    Dec. 10, 2009

Related U.S. Application Data

(60) Provisional application No. 60/797,375, filed on May 4, 2006.

(51) Int. Cl.
*C12M 1/12* (2006.01)
*C12N 11/14* (2006.01)
*C12N 5/00* (2006.01)
*C12N 5/02* (2006.01)

(52) U.S. Cl.
USPC ........ 435/297.1; 435/176; 435/379; 435/395; 435/397; 530/402

(58) Field of Classification Search
USPC .............. 435/297.1, 379, 176–182, 395, 397; 530/402, 811–816
See application file for complete search history.

(56) References Cited

U.S. PATENT DOCUMENTS

| 4,148,689 A | * | 4/1979 | Hino et al. | 435/182 |
| 5,948,464 A | * | 9/1999 | Delnick | 427/77 |
| 2004/0034203 A1 | | 2/2004 | Brook et al. | |

FOREIGN PATENT DOCUMENTS

| WO | WO 97/45367 A1 | 12/1997 |
| WO | WO 2004/018360 A1 | 3/2004 |
| WO | WO 2005/082781 A2 | 9/2005 |
| WO | WO 2007/064305 A1 | 6/2007 |

OTHER PUBLICATIONS

Cukierman, E. et al. 2001 "Taking cell-matrix adhesions to the third dimension" *Science* 294:1708-1712.
Gelain, F. et al. 2006 "Designer self-assembling peptide nanofiber scaffolds for adult mouse neural stem cell 3-dimensional cultures" *PLoS One* 1: e119.

(Continued)

*Primary Examiner* — Michael Marcheschi
*Assistant Examiner* — Shanta G Doe
(74) *Attorney, Agent, or Firm* — Knobbe Martens Olson & Bear LLP

(57) ABSTRACT

A process for making a gel comprising combining a silanol species comprising at least two silanol groups per molecule and a hydrophilic hydroxyl species comprising at least two hydroxyl groups per molecule. The gel is capable of being converted to a liquid by application of a mechanical shear force and the liquid is capable of being converted to the gel in the absence of the mechanical shear force.

25 Claims, 7 Drawing Sheets

OTHER PUBLICATIONS

Hedman, K. et al. 1979 "Isolation of the pericellular matrix of human fibroblast cultures" *J Cell Biology* 81:83-91.

Holmes, T.C. et al. 2000 "Extensive neurite outgrowth and active synapse formation on self-assembling peptide scaffolds" *Proc Natl Acad Sci USA* 97:6728-6733.

Hwang, N.S. et al. 2006 "Effects of three-dimensional culture and growth factors on the chondrogenic differentiation of murine embryonic stem cells" *Stem Cells* 24:284-291.

Mahoney, M.J. and Anseth, K.S. 2006 "Three-dimensional growth and function of neural tissue in degradable polyethylene glycol hydrogels" *Biomaterials* 27:2265-2274.

McBeath, R. et al. 2004 "Cell shape, cytoskeletal tension, and RhoA regulate stem cell lineage commitment" *Developmental Cell* 6:483-495.

Nuttelman, C.R. et al. 2005 "Dexamethasone-functionalized gels induce osteogenic differentiation of encapsulated hMSCs" *J Biomedical Materials Research* 76A: 183-195.

Raeber, G.P. et al. 2005 "Molecularly engineered PEG hydrogels: A novel model system for proteolytically mediated cell migration" *Biophysical Journal* 89:1374-1388.

Salasznyk, R.M. et al. 2004 "Adhesion to vitronectin and collagen I promotes osteogenic differentiation of human mesenchymal stem cells" *J Biomedicine and Biotechnology* 1:24-34.

Sosnik, A. and Sefton, M.V. 2006 "Methylation of poloxamine for enhanced cell adhesion" *Biomacromolecules* 7:331-338.

Vinatier, C. et al. 2005 "A silanized hydroxypropyl methylcellulose hydrogel for the three-dimensional culture of chondrocytes" *Biomaterials* 26:6643-6651.

Walpita, D. and Hay, E. 2002 "Studying actin-dependent processes in tissue culture" *Nature Reviews in Molecular Biology* 3:137-141.

Yang, F. et al. 2005 "The effect of incorporating RGD adhesive peptide in polyethylene glycol diacrylate hydrogel on osteogenesis of bone marrow stromal cells" *Biomaterials* 26:5991-5998.

Zhang, S. et al. 2005 "Designer self-assembling peptide nanofiber scaffolds for 3D tissue cell cultures" *Seminars in Cancer Biology* 15:413-420.

Zisch, A.H. et al. 2003 "Cell-demanded release of VEGF from synthetic, biointeractive cell ingrowth matrices for vascularized tissue growth" *FASEB* 17: 2260-2262.

Gill, I. 2001 "Bio-doped nanocomposite polymers: Sol-gel bioencapsulates" *Chem Mater* 13: 3404-3421.

Wikipedia 2011 "Definition of Condensation Reaction" on the internet at http://en.wikipedia.org/wiki/Condensation_reaction; accessed Jul. 29, 2011.

* cited by examiner a)

b)

c)

d)

| | % Bound RGD (in equilibrium with RGD solution) | % Bound RGD (after 3 washing steps) |
|---|---|---|
| (i) | 41.4 | 0 |
| (ii) | 71.0 | 52.5 |
| (iii) | 84.4 | 82.4 |

# MECHANICALLY REVERSIBLE GEL

This application is U.S. National Phase of International Application PCT/SG2007/000127, filed May 4, 2007 designating the U.S., and published in English as WO 2007/129991 on Nov. 15, 2007, which claims priority to U.S. Provisional Application No. 60/797,375 filed May 4, 2006.

TECHNICAL FIELD

The present invention relates to a mechanically reversible gel and to a process for making it.

BACKGROUND OF THE INVENTION

When the method of culturing mammalian cells became standard laboratory practice in the 1950's, cell biologists started off by culturing the cells on the surface of Petri dishes, where the cells would proliferate in two dimensions. Cells growing on a planar surface could be easily observed at a single, fixed focus of the light microscope. Nutrients in the form of tissue culture media could be easily replenished, with direct contact between the cells and media, and no mass transfer limitations. The cells could be conveniently replated or subcultured to other wells or dishes by trypsinizing the cells from the original surface, while leaving the latter intact. Indeed, the polished practice of 2-dimensional (2-D) culture has contributed to important discoveries in biology and medicine.

In terms of representing the true environment of the cells in vivo, however, it is becoming apparent that a 2-D cell culture is an over-simplification, if not a misrepresentation. With the exception of epithelial cells, most mammalian cells exist in vivo embedded in a 3-D substance or extracellular matrix (ECM). For example, the distribution of cytoskeletal elements in 3-D is vastly different from that in 2-D. Fibroblasts cultured in 2-D show a high concentration of stress fibers on the surface of the cell in contact with the plate, whereas in 3-D, these stress fibers are absent. In view of the fact that the biochemical signals that direct cell fate work in conjunction with biomechanical signals, it can be inferred that the more 'natural' response of a cell towards a biochemical stimuli (e.g. cytokine/drug) would be observed in 3 dimensions. It has been shown that cell adhesion, migration and phenotype in 3-D culture is quite different from 2-D cell culture. Cukierman et al. have also elucidated a mode of matrix adhesion unique to cells in 3-D culture (E. Cukierman, R. Pankov, D. R. Stevens, K. M. Yamada, Taking cell-matrix adhesions to the third dimension, Science, 294 (2001), 1708-1712). In this context, there is a need for systems that are specifically designed for 3-D cell and tissue culture.

The existing 3-D cell culture systems are mainly based on photo-crosslinkable acrylate-based polymers, self-assembled peptides, and matrix-metalloproteinase (MMP) degradable systems. New systems continued to be developed, reflecting the keen interest in this field. However, none of these systems possess the property of reversible gelation.

Existing technology for forming gels for 3-D cell culture relies on the use of chemical crosslinkers, photo-initiators, ultraviolet light or a change in ionic strength for the crosslinking of gels. Gelation based on chemical reaction must be performed with care, since the reaction could be detrimental to the cells and proteins within the gel. Most of the commonly used protein-based gels (e.g. Matrigel and collagen Type I) rely on a change in temperature to induce gelation. This entails the inconvenience of storing the gel precursor at a low temperature, as well as inconsistencies in the setting time of the gel (depending on the cell culture vessel and volume subjected to the temperature change).

There is therefore a need for a gel which is reversibly formable by a convenient and robust means.

OBJECT OF THE INVENTION

It is the object of the present invention to substantially overcome or at least ameliorate one or more of the above disadvantages.

SUMMARY OF THE INVENTION

In a first aspect of the invention there is provided a process for making a gel comprising combining a silanol species comprising at least two silanol groups per molecule and a hydrophilic hydroxyl species comprising at least two hydroxyl groups per molecule.

The process may additionally comprise one or both of the steps of:
  hydrolysing a silane to form the silanol species, said silane having at least two hydrolysable groups per molecule, and
  adjusting the pH to between about 6 and about 9 after the step of combining.

Additionally the process may comprise combining the hydrophilic hydroxyl species with a particulate modifier prior to the step of combining the silanol species with the hydroxyl species. The particulate modifier may comprise silica, e.g. fumed silica. The fumed silica may be surface modified. It may be surface modified to introduce for example amine groups, peptide groups or some other type of group or mixture thereof.

In an embodiment of the invention there is provided a process for making a gel comprising:
  combining a silanol species comprising at least two silanol groups per molecule and a hydrophilic hydroxyl species comprising at least two hydroxyl groups per molecule; and
  adjusting the pH to between about 6 and about 9.

In another embodiment the process comprises:
  hydrolysing a silane to form a silanol species, said silane having at least two hydrolysable groups per molecule;
  combining the silanol species and a hydrophilic hydroxyl species comprising at least two hydroxyl groups per molecule; and
  adjusting the pH to between about 6 and about 9.

In another embodiment the process comprises:
  hydrolysing a silane to form a silanol species, said silane having at least two hydrolysable groups per molecule;
  combining a hydrophilic hydroxyl species comprising at least two hydroxyl groups per molecule with a particulate modifier;
  combining the silanol species and the combined hydrophilic hydroxyl species and particulate modifier; and
  adjusting the pH to between about 6 and about 9.

In another embodiment the process comprises:
  hydrolysing a silane to form a silanol species, said silane having at least two hydrolysable groups per molecule;
  combining a hydrophilic hydroxyl species comprising at least two hydroxyl groups per molecule with fumed silica;
  combining the silanol species and the combined hydrophilic hydroxyl species and fumed silica; and
  adjusting the pH to between about 6 and about 9.

The silane may have between 2 and 10 hydrolysable groups per molecule. The silane may be a sol-gel precursor. The hydrolysable groups may be alkoxylsilyl groups. The silane may for example comprise a tetraalkoxysilane. The silanol species may be a monomeric species. In this case it may have between 2 and 4 silanol groups per molecule. It may be an oligomeric or polymeric species. In this case it may have at least 3 silanol groups per molecule, but may have many more (e.g. between about 3 and 100, or even between 3 and 1000 or more) silanol groups per molecule, depending on the degree of polymerisation.

The hydroxyl species may comprise between 3 and 10 hydroxyl groups per molecule. The hydroxyl species may comprise a hydrophilic chain. It may be a long chain hydrophilic hydroxyl species. The chain may be at least about 10 atoms long, or at least about 20, 50 or 100 atoms long, or between about 10 and about 1000 atoms long. At least two of the hydroxyl groups in each molecule of the hydroxyl species may be endgroups of the molecule. The hydroxyl species may be a branched chain species. Each branch may have a hydroxyl endgroup, or some branches may have hydroxyl endgroups and some may not have hydroxyl endgroups. The hydroxyl species may comprise a polyether chain, for example a branched polyether chain.

The invention also provides a gel made by the process of the first aspect.

The product of the method of the first aspect may be a gel which is suitable for culturing cells. The gel may comprise hydrophilic chains comprising associative groups which can associate reversibly, whereby the gel is capable of being converted to a liquid by application of a mechanical shear force and the liquid is capable of being converted to the gel in the absence of said mechanical shear force. The associative groups may comprise, or may be, OH groups.

In a second aspect of the invention there is provided a gel for culturing cells, said gel comprising hydrophilic chains comprising associative groups which can associate reversibly, whereby the gel is capable of being converted to a liquid by application of a mechanical shear force and the liquid is capable of being converted to the gel in the absence of said mechanical shear force.

The associative groups may be endgroups. Some of the associative groups may be endgroups and some may not be endgroups. The associative groups may comprise one or more groups capable of hydrogen bonding, e.g. OH, NH, SH etc. The associative groups may be derived from a silane comprising at least two hydrolysable groups per molecule. They may be derived therefrom by hydrolysis of at least some, optionally all, of the hydrolysable groups. At least some, optionally all, of the associative groups may comprise, or may be, OH groups. At least some, optionally all, of the associative groups may comprise, or be, silanol groups. Some of the associative groups may be silanol groups and some may be hydroxyl groups. Some of the associative groups may be other hydrogen bonding groups, e.g. amine, thiol etc.

The silane may have between 2 and 10 hydrolysable groups per molecule. The hydrolysable groups may be alkoxylsilyl groups. The silane may for example comprise a tetraalkoxysilane.

The hydrophilic chains may be polyether chains. They may be branched. They may be branched polyether chains.

The gel may additionally comprise water. It may contain cells and/or ECM.

In a third aspect of the invention there is provided the use of a gel according to the second aspect of the invention, or made according to the first aspect of the invention, for culturing cells.

In a fourth aspect of the invention there is provided a method for releasing cells from a gel according to the second aspect of the invention, or made according to the first aspect of the invention, said gel comprising the cells and said method comprising:

combining the gel with a liquid, and
applying sufficient mechanical shear to the combined liquid and gel to form a suspension of the cells in the liquid.

The proportion of liquid in the combined liquid and gel may be greater than about 25% v/v, or greater than about 50% v/v. The liquid may be an aqueous liquid. It may be water. It may be a culture medium for the cells. The suspension of the cells in the liquid may also comprise particles of the gel. The method may additionally comprise the step of removing the particles of the gel from the liquid. This step may comprise straining or filtering the suspension. It may for example comprise straining the suspension through a 100 micron cell strainer to separate the particles of the gel from the liquid.

In a fifth aspect of the invention there is provided a method for incorporating a substance into a gel comprising:

providing a gel according to the second aspect of the invention, or made according to the first aspect of the invention;
applying sufficient mechanical shear to said gel to convert the gel into a liquid;
combining the liquid with the substance; and
allowing the liquid to stand with insufficient mechanical shear to maintain it as a liquid for sufficient time for the liquid to revert to a gel.

The substance may comprise cells and/or ECM and/or proteins and/or other molecules with biological function.

BRIEF DESCRIPTION OF THE DRAWINGS

A preferred embodiment of the present invention will now be described, by way of an example only, with reference to the accompanying drawings wherein.

DETAILED DESCRIPTION OF THE PREFERRED EMBODIMENTS

The present invention relates to a mechanically reversible gel for 3-dimensional cell culture and tissue engineering applications. The gel comprises species which can associate (or aggregate) in order to form a gel. Under the influence of a mechanical shear force the gel can be converted to a liquid. The association of the species comprised by the gel may be reversible. Thus application of a sufficient mechanical shear force may cause reversion of the aggregation, thereby allowing the species to move relative to each other and thereby cause the gel to convert to a liquid. The inventors hypothesize that the association of the species is at least partially due to Van der Waals forces or hydrogen bonding. These lead to relatively weak association of the species, which can be disrupted by moderate shear forces. On removal of the shear force, or on reduction of the shear force to a level which is insufficient to maintain the liquid state, the association of the species may be reestablished, leading to conversion of the liquid to the gel.

Figure 1:
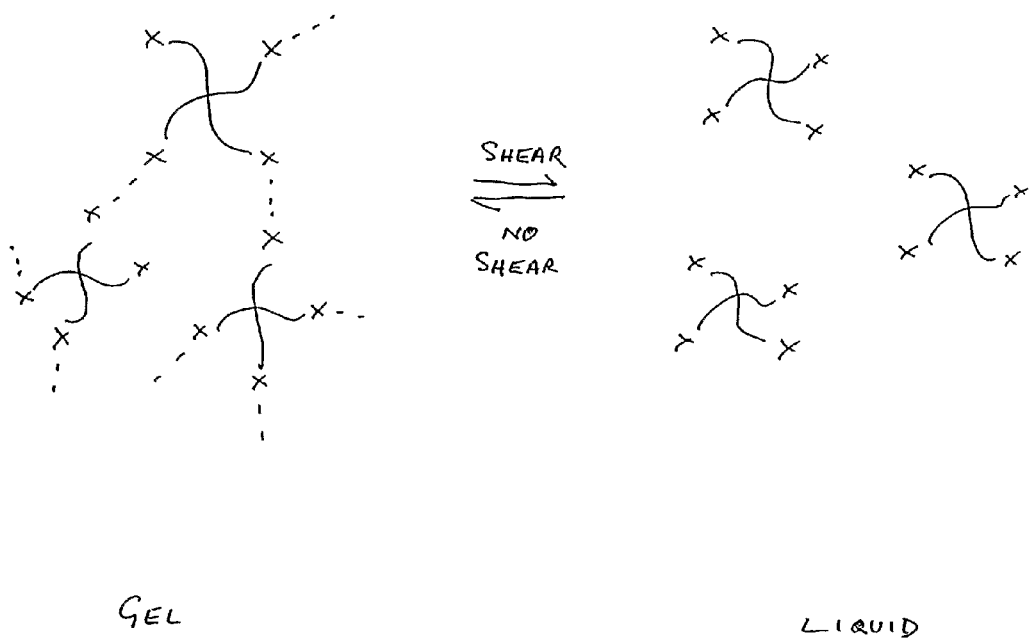
FIG. 1 is a diagrammatic representation of the interconversion of liquid and gel in the present invention.

FIG. 1 illustrates this diagrammatically. In FIG. 1, the associative groups X are located at the ends of the chains. In the gel state, the X groups associate with similar groups on neighbouring molecules. This leads to a loose crosslinking to form a gel network. The crosslinking in this case may be a physical crosslinking or association, for example due to hydrogen bonding, van der Waals attractions etc. Application of sufficient mechanical shear causes rupture of the association of the X groups, thereby disrupting the loose crosslinking and thereby leading to formation of a liquid state in which the molecules can move relative to each other. Removal of the shear force allows the association of the X groups to reform, leading to reformation of the crosslinks (which may be physical crosslinks) and reversion to a gel state.

Figure 2:
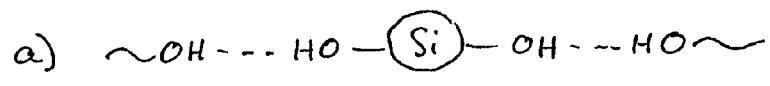
FIG. 2 is an illustration of different types of bonding in a gel according to the present invention whereby the bonding can be ruptured to form a liquid.
Figure 2:
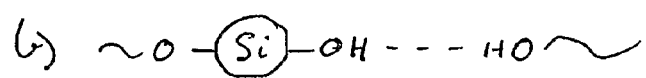
Figure 2:
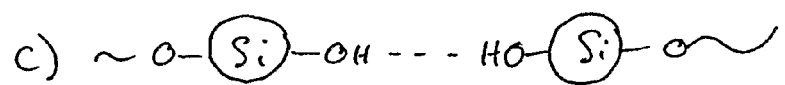
Figure 2:
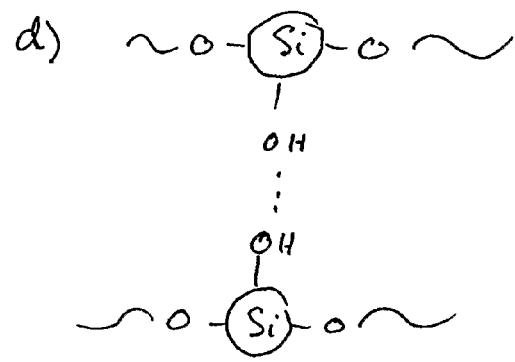

In an embodiment of the invention, the associative groups are silanol groups which are derived from hydrolysis of a silane. FIG. 2 illustrates several types of association that may be present in the gel. In FIG. 2, the silanol species represented by Si in a circle may be monomeric, oligomeric or polymeric. Thus hydrolysis of a tetralkoxysilane may produce Si(OH)$_4$ (or partially or fully deprotonated derivatives thereof), oligomers thereof (e.g. (Si(OH)$_3$)$_2$O, (HO)$_3$Si—O—Si(OH)$_2$—O—Si(OH)$_3$ etc.), and polymers and/or crosslinked networks. These crosslinked networks may represent silica-like structures. In each case, however, the silanol species will contain at least two silanol groups, and may contain many more. In the case of the silica-like crosslinked structures, depending on the degree of polymerisation, there may be hundreds, thousands or more silanol groups per macromolecule. Thus the structures shown in FIG. 2 include:

a) two OH groups on two separate hydrophilic chains each hydrogen bonded to a single silanol species to form a temporary crosslink site, which may be at least partially ruptured or disrupted by mechanical shear;

b) a silanol species has formed a covalent link to a hydrophilic chain by condensation of one of its silanol groups with an OH group of the hydrophilic chain. The resultant species may hydrogen bond to an OH group of another hydrophilic chain to form a temporary crosslink site, which may be ruptured by mechanical shear;

c) a silanol species has formed a covalent link to a hydrophilic chain by condensation of one of its silanol groups with an OH group of the hydrophilic chain. The resultant species can hydrogen bond another similar group on another hydrophilic chain to form a temporary crosslink site, which may be ruptured by mechanical shear;

d) a silanol species has joined two hydrophilic chains by condensation of one of its silanol groups with an OH group on each of the chains, thereby covalently linking the two chains. A third silanol group on the silanol species is free to hydrogen bond with some other OH (e.g. on a hydrophilic chain, a silanol species etc.) to form a temporary crosslink site, which may be ruptured by mechanical shear. In the example shown, the hydrogen bonding is between two similar groups, but this is not necessarily the case.

It will be apparent to one skilled in the art that other similar structures not explicitly described above may also form by hydrogen bonding and/or Van der Waals attractions to form temporary crosslink sites, which may be ruptured by mechanical shear. It will also be apparent that in the gel of the present invention, more than one, possibly all, of the above described structures may be present.

The present invention provides a process for making a gel as described above. The process comprises combining a silanol species comprising at least two silanol groups per molecule and a hydrophilic hydroxyl species comprising at least two hydroxyl groups per molecule.

The process may additionally comprise one or both of the steps of:
  hydrolysing a silane to form the silanol species, said silane having at least two hydrolysable groups per molecule, and
  adjusting the pH to between about 6 and about 9 after the step of combining.

The silanol species may be a monomeric species. In this case it may have between 2 and 4 (e.g. 2, 3 or 4) silanol groups per molecule. It may be an oligomeric or polymeric species. In this case it may have at least 3 silanol groups per molecule, but may have many more (e.g. between about 3 and 100, or even between 3 and 1000 or more) silanol groups per molecule, depending on the degree of polymerisation. Thus as described above, Si(OH)$_4$, (which may be formed by hydrolysis of a tetraalkoxysilane) may polymerise or oligomerise. It may form dimers, trimers, tetramers etc. It may form linear, branched and/or crosslinked structures. All of these structures are characterised by having a plurality of silanol groups. If crosslinked, the structures may have silica-like structures. The silanol species may be soluble in water or it may be insoluble in water, or it may be sparingly soluble in water. The silanol species may comprise any two or more of the structures described above, for example it may comprise monomeric silanol species together with one or more oligomeric silanol species optionally with different degrees of polymerisation. The (or each) silanol species may have a degree of polymerisation of between 1 and 100 or more, or between 1 and 50, 1 and 20, 1 and 10, 1 and 5, 2 and 100, 5 and 100, 10 and 100, 50 and 100, 5 and 50, 5 and 20 or 5 and 10, e.g. about 1, 2, 3, 4, 5, 6, 7, 8, 9, 10, 15, 20, 25, 30, 35, 40, 45, 50, 60, 70, 80, 90 or 100.

The silane from which the silanol is made may have between 2 and 10 hydrolysable groups per molecule. It may be monomeric. It may be oligomeric. It may have 2-4 hydrolysable groups, or 2-6, 4-10 or 3-8 hydrolysable groups, e.g. 2, 3, 4, 5, 6, 7, 8, 9 or 10 hydrolysable groups. It may also, optionally, have one or more non-hydrolysable groups per molecule. These may be alkyl groups (e.g. C1-C12, or C1 to C6, or C1 to C4 alkyl, all of which may be either straight chain or branched, for example methyl, ethyl, propyl, isopropyl, hexyl etc.), or may be aryl groups (e.g. C6 to C14 aryl, or C6 to C10 aryl, such as phenyl, naphthyl, anthracyl), or may be functional groups or functional alkyl groups. They may be for example amino- or halo-alkyl (e.g. aminopropyl or halopropyl) groups. The halogen in this case may be F Cl, Br or I. The hydrolysable groups may be alkoxylsilyl groups, or may be oximosilyl groups or may be alkanoyloxysilyl (e.g. acetoxysilyl) groups or may be benzamidosilyl groups or may be enoloxysilyl groups or may be some other type of hydrolysable silyl group, or may have a mixture of different such hydrolysable groups. The silane may for example comprise a tetraalkoxysilane. It may be tetramethyl, tetraethyl, tetrapropyl, tetraisopropyl or tetrabutyl silane. It may be a trialkoxylsilane, e.g. methyltrimethoxysilane, methyltriethoxysilane, isopropyltriethoxysilane, aminopropyltriethoxysilane etc.

The step of hydrolysing the silane may comprise exposing the silane to an acidic solution containing water. It may be an aqueous acid. The aqueous acid may be an organic acid, e.g. acetic acid, propionic acid, formic acid, citric acid and malonic acid etc. or may be an inorganic acid, e.g. sulfuric, hydrochloric acid, nitric acid, phosphoric acid etc. The concentration of the acid may be between about 0.001 and 1M, at least in part depending on the nature (particularly the pKa) of the acid, or between about 0.01 and 1, 0.1 and 1, 0.001 and 0.1, 0.001 and 0.01 or 0.01 and 0.1M. The pH of the aqueous acid may be between about 1 and about 4, or about 1 to 3, 1 to 2, 2 to 4, 3 to 4 or 2 to 3, e.g. about 1, 1.5, 2, 2.5, 3, 3.4 or 4. The hydrolysis may be for sufficient time for the silane to hydrolyse to the extent that the products are soluble in the aqueous acid. It may be for between about 1 minute and about 12 hours, or about 30 minutes to 12 hours, 1 to 12, 2 to 12 or 6 to 12 hours, or about 1 to 60, 1 to 30, 1 to 10, 1 to 5, 5 to 60, 10 to 60 or 30 to 60 minutes, e.g. about 1, 2, 3, 4, 5, 10, 15, 20, 25, 30, 40 or 50 minutes, or about 1, 1.5, 2, 2.5, 3, 4, 5, 6, 7, 8, 9, 10, 11 or 12 hours. It may be at a sufficient temperature to hydrolyse the silane to the extent that the products are soluble in the aqueous acid in the desired time. Commonly hydrolysis is at room temperature, but may be at any suitable temperature between about 5 and 50° C., or about 5 to 30, 5 to 25, 5 to 20, 5 to 15, 5 to 10, 10 to 50, 20 to 50, 30 to 50, 10 to 30 or 15 to 25° C., e.g. about 5, 10, 15, 20, 25, 30, 35, 40, 45 or 50° C. or more. In an example, a tetraalkoxysilane is hydrolysed in an aqueous organic acid. The ratio of tetraalkoxysilane to organic acid may be between about 1:2 and about 1:20 on a volume basis, or about 1:2 and 1:10, 1:2 and 1:5, 1:5 and 1:20, 1:10 and 1:20, 1:5 and 1:15, 1:5 and 1:10 or 1:8 and 1:10, e.g. about 1:2, 1:3, 1:4, 1:5, 1:6, 1:7, 1:8, 1:9, 1:10, 1:11, 1:12, 1:13, 1:14, 1:15, 1:16, 1:17, 1:18, 1:19 or 1:20.

The hydroxyl species may comprise between 3 and 10 hydroxyl groups per molecule, or between about 3 and 8, 3 and 6 or 3 and 5, e.g. about 3, 4, 5, 6, 7, 8, 9 or 10. The hydroxyl species may comprise a hydrophilic chain. It may be a long chain hydrophilic hydroxyl species. The chain may be at least about 10 atoms long, or at least about 15, 20, 25, 30, 35, 40, 45, 50, 60, 70, 80, 90 or 100 atoms long, or between about 10 and about 1000 atoms long or about 10 to 500, 10 to 100, 10 to 50, 50 to 1000, 100 to 1000, 200 to 1000, 500 to 1000, 50 to 500 or 100 to 500 atoms long, e.g. about 10, 15, 20, 25, 30, 35, 40, 45, 50, 60, 70, 80, 90, 100, 150, 200, 250, 300, 350, 400, 450, 500, 600, 700, 800, 900 or 1000 atoms long. It may be a polymer. It may be an oligomer. It may be a dendrimer. It may be a hyperbranched polymer or oligomer. At least two of the hydroxyl groups in each molecule of the hydroxyl species may be endgroups of the molecule. The hydroxyl species may be a branched chain species. Each branch may have a hydroxyl endgroup, or some branches may have hydroxyl endgroups and some may not have hydroxyl endgroups. In some embodiments, the endgroup of each branch is a hydroxyl group. The hydroxyl species may comprise a polyether chain, for example a branched polyether chain. Thus in some embodiments, the hydroxyl species is a branched (e.g. 4 arm) polyether having hydroxyl groups at the end of each arm. The molecular weight of the hydroxyl species may be between about 500 and about 50000 or between about 500 and 10000, 500 and 5000, 500 and 1000, 1000 and 50000, 10000 and 50000, 20000 and 50000 or 1000 and 10000, e.g. about 500, 600, 600, 800, 900, 1000, 1500, 2000, 2500, 3000, 3500, 4000, 4500, 5000, 6000, 7000, 8000, 9000, 10000, 15000, 20000, 25000, 30000, 35000, 40000, 45000 or 50000 or more. The molecular weight per silanol, or per branch, may be between about 200 and about 20000, or between about 500 and 20000, 1000 and 20000, 5000 and 20000, 10000 and 20000, 200 and 10000, 200 and 2000, 100 and 1000, 200 and 500, 500 and 5000, 1000 and 5000 or 500 and 2000, e.g. about 200, 300, 400, 500, 600, 700, 800, 900, 1000, 1500, 2000, 2500, 3000, 2500, 4000, 4500, 5000, 6000, 7000, 8000, 9000, 10000, 11000, 12000, 13000, 14000, 15000, 16000, 17000, 18000, 19000 or 20000. The branches may be the same length, or may be similar length, or may be different lengths. Some of the branches may be the same or similar lengths and some may be different lengths. The hydroxyl species may comprise PEG, or some other hydroxyl-containing polymers such as a polysaccharide. It may be a natural polymer. It may be a synthetic polymer. It may be a modified natural polymer. An alkoxyfunctional polymer may be used in place of a hydroxyl containing polymer. In this case, the process may comprise hydrolysing the alkoxy groups of the polymer. This may be performed prior to exposing to the silanol species, or it may be conducted in situ. It may occur at the same time as interaction with the silanol species.

In some embodiments, the process may comprise combining the hydrophilic hydroxyl species with a particulate modifier prior to the step of combining the silanol species with the hydroxyl species. The particulate modifier may comprise silica, e.g. fumed silica. The fumed silica may be surface modified. It may be surface modified to introduce for example amine groups, peptide groups or some other type of group or mixture thereof. Thus hydrogen bonding can couple the hydrophilic hydroxyl species to particles of the silica. The silica may be in the form of fumed silica, which has very small primary particles. It will be appreciated that silica particles have a large number of silanols on the surface, and therefore are capable of hydrogen bonding to several molecules of the hydrophilic hydroxyl species. The silica may optionally be surface modified silica. It may have amine groups, peptide groups or other functional groups on the surface thereof. The functional groups on the surface of the particulate modifier may be hydrogen bonding groups. The particulate modifier may modify the physical properties of the gel. It may be regarded as a filler. Other well known particulate modifiers may be used e.g. cellulose or polysaccharides such as alginate, heparin, chitosan, chitin.

Compounds containing hydroxyl groups may be introduced to modify the chemical and physical properties of the gel. For example ethanolamine may be added prior to the base-catalyzed condensation of PEG and hydrolyzed TEOS so as to introduce amine functionality into the gel and thereby make it more hydrophilic. The PEG-SiO2 gel could also be functionalized by various silanes. Other modifying compounds include hydroxy-acids, monosaccharides, oligosaccharides, polysaccharides and peptides. These may be used to modify the hydroxyl species before the formation of the gel, or may be used to modify the gel after the hydroxyl species is combined with the silanol species.

The ratio of hydroxyl species to silanol species may be between about 1:5 and about 1:1 on a volume basis, or between about 1:5 and 1:2, 1:5 and 1:3, 15 and 1:4, 1:4 and 1:1, 1:3 and 1:1, 1:2 and 1:1, 1:4 and 1:2 or 1:2 and 1:1.5, e.g. about 1:1, 1:1.5, 3:5, 1:2, 1:2.5, 1:3, 1:3.5, 1:4, 1:4.5 or 1:5. The ratio may some other ratio, depending on the functionality of the silanol species and of the hydroxyl species, and the concentration of the silanol species.

Following the combining, the resulting mixture may be agitated, e.g. stirred, vortexed, swirled, shaken, sonicated etc. It may be agitated until it is visually homogeneous. It may then be sterilised. This may be achieved by filtration, preferably sterile filtration, through a sterilising filter, e.g. 0.45, 0.2 or 0.11 micron filter. Alternatively, or additionally, it may be sterilised by UV radiation or some other type of sterilisation.

The mixture may be pH adjusted. The adjustment may comprise adding a base, or a buffer, sufficient to achieve the desired pH. The base may be for example a hydroxide (e.g. sodium hydroxide or potassium hydroxide or ammonium hydroxide) or some other base. The adjustment may be to a pH at which gelation occurs. It may be to a pH at which the silanol species can gel. The adjustment may be to a basic pH. It may be to a pH of between about 6 and about 10, or about 6 to 9, 7 to 9, 7 to 10, 7.5 to 10, 7.5 to 9, 7 to 7.4, 7.1 to 9 or 7.1 to 8, e.g. about 6, 6.5, 7, 7.1, 7.2, 7.3, 7.4, 7.5, 7.6, 7.7, 7.8, 7.9, 8, 8.5, 9, 9.5 or 10. This may cause the silanol species to condense, oligomerise, crosslink, polymerise or more than one of these. On standing, a gel may be formed. The standing may be with no agitation, or with very mild agitation. Any agitation should be sufficiently gentle to permit formation of the gel. The standing may be for at least 1 hour, or at least about 2, 3, 4, 5, 6, 9, 12, 15, 18 or 24 hours, or about 1 to about 48 hours, or about 1 to 36, 1 to 24, 1 to 18, 1 to 12, 6 to 48, 12 to 48, 24 to 48, 6 to 24, 6 to 18 or 18 to 24 hours, e.g. about 1, 2, 3, 4, 5, 6, 9, 12, 15, 18, 21, 24, 30, 36, 42 or 48 hours.

In an embodiment of the invention there is provided a process for making a gel comprising:
 hydrolysing a silane to form a silanol species, said silane having at least two hydrolysable groups per molecule
 combining the silanol species, comprising at least two silanol groups per molecule, and a hydrophilic hydroxyl species comprising at least two hydroxyl groups per molecule, and
 adjusting the pH to between about 6 and about 9 after the step of combining.

In another embodiment there is provided a process for making a gel comprising:
 hydrolysing a tetraalkoxysilane in an aqueous acid to form a silanol species,
 combining the silanol species, and a branched polyether comprising at least two hydroxyl endgroups per molecule, and
 adjusting the pH to between about 7 and about 8 after the step of combining.

In another embodiment there is provided a process for making a gel comprising:
 hydrolysing a tetraalkoxysilane in an aqueous acid to form a silanol species,
 combining the silanol species and a branched polyether comprising at least two hydroxyl endgroups per molecule to form a mixture,
 sterilising the mixture,
 adjusting the pH of the mixture to between about 7 and about 8 after the step of combining, and
 allowing the mixture to stand without agitation for sufficient time to form the gel.

The gel of the present invention comprises hydrophilic chains which comprise associative groups. As described above, these groups can associate reversibly. Thus when the groups are associated, the associations form reversible crosslinks, and the gel is in a gel form. The gel is capable of being converted to a liquid form by application of a mechanical shear force sufficient to rupture at least some of the reversible crosslinks. On removal of the mechanical shear force, or on reduction of the mechanical shear force to below a threshold level, the liquid is capable of being converted to the gel, as the reversible crosslinks reform. The conversion of the liquid to the gel may take between about 10 s and about 1 hour, or between about 30 s and 1 hour, 1 minute and 1 hour, 5 minutes and 1 hour, 10 minutes and 1 hour, 30 minutes and 1 hour, 10 s and 30 minutes, 10 s and 10 minutes, 10 s and 1 minute, 10 and 30 s, 1 and 30 minutes, 1 and 10 minutes, 1 and 5 minutes or 5 and 20 minutes, e.g. about 10, 15, 20, 25, 30, 35, 40, 45, 50 or 55 s, or about 1, 2, 3, 4, 5, 6, 7, 8, 9, 10, 15, 20, 25, 30, 35, 40, 45, 50 or 55 minutes or about 1 hour, or may take more than 1 hour. These times may be dependent on temperature. They may apply at a temperature of between about 10 and 30° C., or between about 10 and 20, 20 and 30 or 15 and 25° C., e.g. about 10, 15, 20, 25 or 30° C.

The associative groups may be along the hydrophilic chains, or they may be at the ends of the hydrophilic chains, or some may be at the end of a hydrophilic chain and some may be along the chain (i.e. not at an end). The associative groups may be derived from a silane comprising at least two hydrolysable groups per molecule as described above.

The silane may have between 2 and 10 hydrolysable groups per molecule or between 2 and 6, 2 and 4, 4 and 10 or 6 and 10, e.g. 2, 3, 4, 5, 6, 7, 8, 9 or 10. The hydrolysable groups may be alkoxylsilyl groups or other groups as described earlier.

Thus in an embodiment, there is provided a gel for culturing cells, said gel comprising hydrophilic chains comprising associative groups at the ends of said chains, wherein said groups can associate reversibly, whereby the gel is capable of being converted to a liquid by application of a mechanical shear force and the liquid is capable of being converted to the gel in the absence of said mechanical shear force.

In another embodiment there is provided a gel for culturing cells, said gel comprising hydrophilic chains comprising associative groups derived from hydrolysis of a tetraalkoxysilane, said groups being at the ends of said chains, wherein said groups can associate reversibly, whereby the gel is capable of being converted to a liquid by application of a mechanical shear force and the liquid is capable of being converted to the gel in the absence of said mechanical shear force.

The hydrophilic chains may be polyether chains. They may be branched. They may be branched polyether chains. They may have between 2 and 20 endgroups or more, or between 2 and 10, 2 and 6, 3 and 20, 6 and 20 or 10 and 20, e.g. about 2, 3, 4, 5, 6, 7, 8, 9, 10, 11, 12, 13, 14, 15, 16, 17, 18, 19 or 20 endgroups. The hydrophilic chains may in some embodiments comprise hyperbranched polymers, hyperbranched oligomers, starburst dendrimers or some other branched structure.

The gel may additionally comprise water. In some embodiments it may be a hydrogel. It may contain cells and/or ECM. The cells and/or ECM may be capable of being released from the gel by conversion of the gel to a liquid by means of mechanical action.

In a further embodiment there is provided a gel for culturing cells, said gel comprising:

hydrophilic chains comprising associative groups which can associate reversibly,
water; and
cells and/or ECM
whereby the gel is capable of being converted to a liquid by application of a mechanical shear force and the liquid is capable of being converted to the gel in the absence of said mechanical shear force.

The gel of the present invention may be suitable for culturing cells. The gel may optionally comprise nutrients and other required materials for the cells, and may provide an environment capable of sustaining cell growth. The cells, once cultured in the gel, may be released therefrom by mechanical action.

Thus the invention also provides a method for releasing cells from a gel the cells, where the gel is as described above. The method comprises combining the gel with a liquid, and applying sufficient mechanical shear to the combined liquid and gel to form a suspension of the cells in the liquid.

The proportion of liquid in the combined liquid and gel may be greater than about 25% v/v, or greater than about 30, 35, 40, 45, 50, 55, 60, 65, 70, 75, 80, 85, 90 or 95% v/v, or may be between about 25 and about 95%, or about 25 to 80, 25 to 60, 25 to 50, 30 to 95, 40 to 95, 50 to 95, 60 to 95, 30 to 80, 40 to 80, 50 to 80, 30 to 70 or 40 to 60%, e.g. about 25, 30, 35, 40, 45, 50, 55, 60, 65, 70, 75, 80, 85, 90 or 95%, or in some instances may be more than 95%. The liquid may be an aqueous liquid. It may be a culture medium for the cells. It may be a solution of nutrients in water. The suspension of the cells in the liquid may also comprise particles of the gel, which are formed by partial disintegration of the gel. The method may additionally comprise the step of removing the particles of the gel from the liquid. This step may comprise straining or filtering the suspension. It may for example comprise straining the suspension through a 100 micron cell strainer to separate the particles of the gel from the liquid. The cell strainer, or filter cutoff may be greater than the cell diameter. It may be for example greater than about 10, 25, 50, 100, 150 or 200 microns, or between about 10 and 200, 10 and 100, 10 and 50, 20 and 200, 50 and 200, 100 and 200 or 50 and 150 microns, e.g. about 10, 20, 30, 40, 50, 60, 70, 80, 90, 100, 110, 120, 130, 140, 150, 160, 170, 180, 190 or 200 microns, depending on the nature, particularly the size, of the cells and the size of the gel particles. The straining or filtering may be conducted under gravity, or under mild suction or mild pressure in order to accelerate the passage of the suspension through the strainer or filter.

One embodiment of the gel of the present invention comprises polyethylene glycol combined with a hydrolysed silane. This is referred to herein as "PEG-SiO$_2$", although it should be recognised that the structure of the hydrolysed silane may comprise silica-like structures, orthosilicic acid like structures and other structures as described earlier.

In accordance with this embodiment the inventors have developed a polymer-silica composite gel with mechanically reversible Theological properties for 3-dimensional (3-D) cell culture and tissue engineering. This gel was formed by the base-catalyzed reaction between 4-arm polyethylene glycol (PEG) and hydrolyzed tetraethylorthosilicate (TEOS), which resulted in a condensed PEG-SiO$_2$ network. The PEG-SiO$_2$ gel has a unique property of reversible gelation. It was liquefied when vortexed to allow for ligands and cells to be added, and was able to reset into a gel in a matter of minutes. The liquid-gel setting time could be tailored by varying the gel composition. The gel was robust and strong, and could be picked up and manipulated. It was insoluble, yet porous enough for cell culture media, nutrients and gases to diffuse through it. An advantage of this gel over existing gels for 3-D cell culture is its unique reversible gelation property. The PEG-SiO$_2$ may liquefy when vortexed to allow ligands and cells to be added, and reset into a gel in a short space of time, for example a few minutes.

Live-dead assays and confocal microscopy have indicated human mesenchymal stem cell (hMSC) survival and 3-D spreading after 1 week in PEG-SiO$_2$ gels containing RGD ligands, confirming that this PEG-SiO$_2$ gel is non-toxic and supports cell growth. RGD is a tripeptide of the sequence Arg-Gly-Asp. MC-3T3 is a mouse pre-osteoblastic cell line. The viability of MC-3T3 cells in gels with and without incorporated extracellular matrix (ECM) was also established. Due to the unique liquefaction property of the gel of the invention, cells could be passaged without trypsinization. Thus at the end of the cell culture experiment, the culture media or phosphate-buffered saline can be added, and gentle agitation will cause the gel to disintegrate irreversibly to release the cells, cell aggregates or tissue structures. Cellular structures and ECM could also be harvested in this manner. In addition, the PEG-SiO$_2$ gel was bioinert, and could be easily functionalized with the desired type of ligand for the adhesion and signalling of specific cell types.

Thus, the present invention is based on thixotropy and reversible gelation. The gelation mechanism is believed to involve the reestablishment of Van der Waals forces, and is not believed to involve any chemical reaction. Compared to commercially available 3-D cell culture systems, the gel of the present invention has a unique reversible gelation property. It is liquefied when vortexed to allow ligands and cells to be added, but is able to reset into a gel in a short space of time, e.g. several minutes. The liquid-gel setting time may be tailored by varying the composition of the PEG-SiO$_2$ gel, which is manipulated in advance during the manufacturing process. At the end of the cell culture experiment, the culture media or phosphate-buffered saline can be added, and gentle agitation will cause the gel to disintegrate irreversibly to release the cells, cell aggregates or tissue structures.

The gel of the present invention may be marketed in the form of a preformed gel, unlike most existing systems which are marketed in the form of liquid precursors. It is convenient to use since the protocol simply involves the vortexing of the gel prior to adding the cell suspension.

As the gel components, PEG and SiO$_2$, are not naturally present in the mammalian physiology, they are unlikely to signal for stem cells to differentiate or remain in an undifferentiated state. This is different from gels derived from biological materials, such as Matrigel or collagen Type I, where signalling events due to the biological component may occur, and would vary depending on the type of stem cell. For example, it has been reported that exposure of hMSC to collagen Type I leads to its differentiation into osteoblast, which would be an undesirable outcome if the purpose of the cell culture was for stem cell expansion. Thus, the gel presented herein provides an inert Theological platform upon which biosignals can be presented in a customized fashion.

In previous 3-D culture systems, the gelation phenomenon was based on molecular interactions involving covalent bond formation or ionic interactions, induced by crosslinking reactions or a change in the ionic strength of the gel precursor. In contrast, the present system is based on thixotropy and reversible gelation. The liquid-gel setting time could be tailored by using different concentrations of PEG-SiO$_2$ in the material. Addition of a sufficient quantity of a liquid culture media and gentle agitation can cause the gel to disintegrate to release the cells. This disintegration may be irreversible. This would facilitate the harvesting of cellular structures and ECM. This unique 'liquefaction property' could also allow cells to be passaged without trypsinization.

The PEG-SiO$_2$ gel may be especially attractive for application towards stem cell technology. In contrast to the culture of cell lines where the primary goal is to maintain the cells in a healthy, proliferative state, the culture of stem cells calls for the provision of signals to either maintain the cells in a multipotent state or nudge it along a particular differentiation pathway. Since PEG and SiO$_2$ are not naturally present in the mammalian physiology, the PEG-SiO$_2$ gel is not likely to signal for either the differentiated or undifferentiated state. This would be in contrast to gels derived from biological materials, such as collagen Type I or Matrigel, which would almost certainly affect the stem cell culture depending on the cell type. The ease of functionalization of PEG and SiO$_2$ would facilitate the further development and modification of the PEG-SiO$_2$ system. The introduction of multiple ligands would lead to a multifunctional gel, where the signals for stem cell proliferation and differentiation could be provided in a controlled manner in a 3-D environment. This would present a valuable tool for therapeutic tissue engineering, as well as for basic investigations of stem cell biology.

The general concept of a 'rheology controlled', mechanically reversible gel might be widely applied for 3-D culture systems. While in some embodiments the present gel is based on PEG-SiO$_2$, other gel compositions may exist to provide for the mechanically reversible rheological property described.

Applications for the medium of the present invention include:
- 3-D cell culture for cell lines, primary cells, or stem cells; cells could be grown in three dimensions into tissue as in vitro models for cancer research (e.g. models of metastasis), drug development and cytotoxicity testing, or high-content drug screening;
- tissue engineering: both in vitro and in vivo for the engineering and regeneration of tissues and organs;
- as a substrate for imaging of cells in three dimensions, in conjunction with immunolabeling;
- for patterning, layering and molding of gels into 3-D shapes (e.g. tubes);
- for use in cryopreservation of cells and tissues

EXAMPLES

Materials and Methods

The present experiment used 4-armed PEG with MW about 2000, with equal length arms in which the arms are joined by pentaerythritol C(CH$_2$OH)$_4$. The 4-arm PEG was sterile filtered through a 0.45-μm filter, and vortexed with fumed silica (FS, Cab-osil M5, Sigma, USA) until a homogeneous mixture was obtained. FS loadings of 0, 5, 10 and 15 wt % were used. TEOS was hydrolyzed by vortexing with 0.15 M acetic acid (TEOS:acetic acid=1:9 by volume) for 1 h or until a single phase was obtained. The hydrolyzed TEOS solution was added to 4-arm PEG-FS (TEOS:PEG=1:2.09 by moles) at a volume ratio of 3:5, and vortexed until homogeneous. The mixture was sterile filtered through a 0.20 or 0.45 μm filter for cell culture experiments. Ammonia solution (25-35%) was added to the mixture until the final pH was about 7.4. A gel was formed on standing overnight with the container covered. The gel was washed in deionized water with 1% penicillin/streptomycin (antibiotics) to remove ethanol before use. The gel formed a particulate suspension in water, which was collected by centrifuging at 300-1000 rcf.

For cell culture, the gel was first vortexed to a liquid state. Cell suspension in the respective media was then added to the gel with gentle tituration to uniformly disperse the cells. The gel was diluted with up to 20% of cell suspension by volume. The mixture of gel and cells was then transferred to the culture vessel (i.e. flask, petri dish or coverslip). The tissue culture media was added before the gel was reset (i.e. in 1-15 min). The culture vessel was then transferred to the cell culture incubator.

Fourier-transform infrared (FTIR) spectroscopy was used to characterize the silica gel formed by the base-catalyzed gelation of hydrolyzed TEOS, and the dehydrated PEG-SiO$_2$ gel. The PEG-SiO$_2$ gel was subjected to rheological tests to determine the minimum shear stress ($\tau_{min}$) required for gel-liquid transition, as well as the liquid-gel transition ($t_{liquid-gel}$) time upon removal of the shear stress. The liquid-gel transition time was the maximum working time for the addition of cells, ligands, etc. to the liquefied gel before gelation occurred again. The PEG-SiO$_2$ gel was also diluted with 0-20% cell culture media to vary the $\tau_{min}$ and $t_{liquid-gel}$.

Example 1

Introduction of RGD Ligands to Activated PEG

Figure 3:
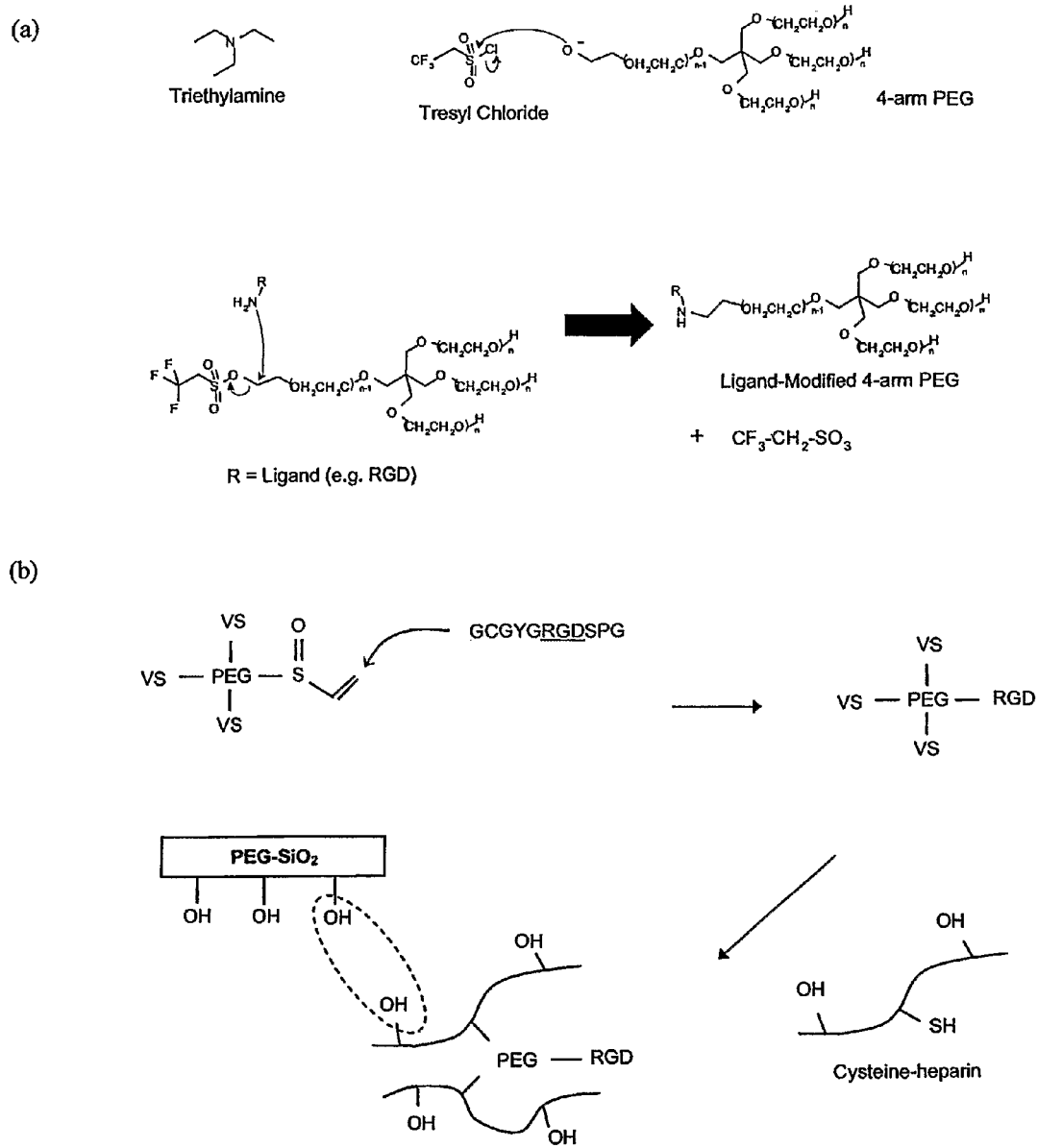
FIG. 3 is a scheme showing (a) introduction of RGD ligands to activated PEG, and (b) incorporation of RGD and heparin via thiol addition.

In the presence of triethylamine, 4-arm PEG could be coupled to tresyl chloride by nucleophilic substitution. Ligands containing amino groups could then be coupled to the activated 4-arm PEG, resulting in the final ligand-modified 4-arm PEG. This ligand-modified PEG was next combined with 10% v/v unmodified 4-arm PEG and hydrolyzed TEOS, and the pH was increased to catalyze the gel formation (FIG. 3a).

Synthesis of Modified PEG 4-arm PEG was activated with tresyl chloride using standard methods. Tresyl chloride-activated 4-arm PEG was dissolved and stored in 1 mM HCl prior to use. For coupling of galactose ligand, 0.1126 g of 1-amino-1-deoxy-β-D-galactose was dissolved in 15 mL of pH 8.5 PBS. To 15 mL of the latter solution, 10 mL of tresyl chloride activated 4-arm PEG was added. The reaction mixture was stirred for 22 h at 4° C. and stored at 4° C. For coupling of RGD (arg-gly-asp) ligand, 75 μL of RGD solution was dissolved in 1.425 mL of pH 8.5 PBS. To 1.5 mL of the latter solution, 1 mL of tresyl chloride activated 4-arm PEG was added.

Example 2

Introduction of RGD and Heparin Via Thiol Addition

For PEG-VS route: PEG-VS (polyethyleneglycol-vinyl sulfone) (8.62 mg/ml) was combined with RGD (1 mg/ml) in a ratio of 9:1 by volume. This PEG-VS-RGD mixture was then combined with cysteine-heparin (33.2 mg/ml) in a ratio of 7:6 by volume.

For MAL-PEG-MAL route: MAL-PEG-MAL (maleimide-polyethyleneglycol-maleimide) (10.8 mg/ml) was combined with RGD (4 mg/ml) in a ratio of 1.22:1 by volume. This MAL-PEG-MAL-RGD mixture was then combined with cysteine-alginate (7.35 mg/ml) in a ratio of 1:1.59 by volume.

4-arm PEG-VS or MAL-PEG-MAL was reacted with cysteine-heparin and a thiol-containing RGD peptide, GCGYGRGDSPG at different ratios. The ligand-modified PEG was mixed with unmodified 4-arm PEG and hydrolyzed TEOS at a volume fraction of up to 20%, before the pH was increased by base addition to condense the hydroxyl groups (indicated by the dotted lines) in forming the gel network (FIG. 3b).

Example 3

Incorporation of MC-3T3 ECM

ECM from MC-3T3, an osteoblast cell line, was isolated according to methods in literature. Briefly, a solution of 1 mM of phenylmethanesulfonyl fluoride (PMSF) and 0.5% deoxycholate in pH 8 TRIS buffer was used to lyse MC-3T3 cells that had been grown to confluency for 1 week. A solution containing 0.02% DNASE I and PMSF was then introduced to remove the genetic material. The ECM was detached and suspended using deionized water, and washed by centrifugation. To incorporate ECM in the gel, the ECM was pelleted at 500 rcf, 4° C. for 5 min. 500 µL of liquefied PEG-SiO$_2$ gel were added to the ECM (extracted from a 100 mm-diameter Petri dish). The resulting suspension was vortexed to obtain a uniform dispersion. For cell culture, 4.5×10$^5$ cells in 10 µL of cell suspension were dispersed in 100 µL of gel liquefied by gentle tituration in a vial, and transferred to a coverslip in a 24-well plate. After 5-15 min, α-MEM tissue culture media were added to the well, and the plates were returned to the incubator at 37° C., 5% CO$_2$.

In general, cells were cultured in the RGD- and heparin-modified PEG-SiO$_2$ gels and ECM-incorporated gels for 1 week before performing the live-dead assays.

Example 4

Introduction of RGD Ligands to Modified Fumed Silica (FS)

Figure 7:
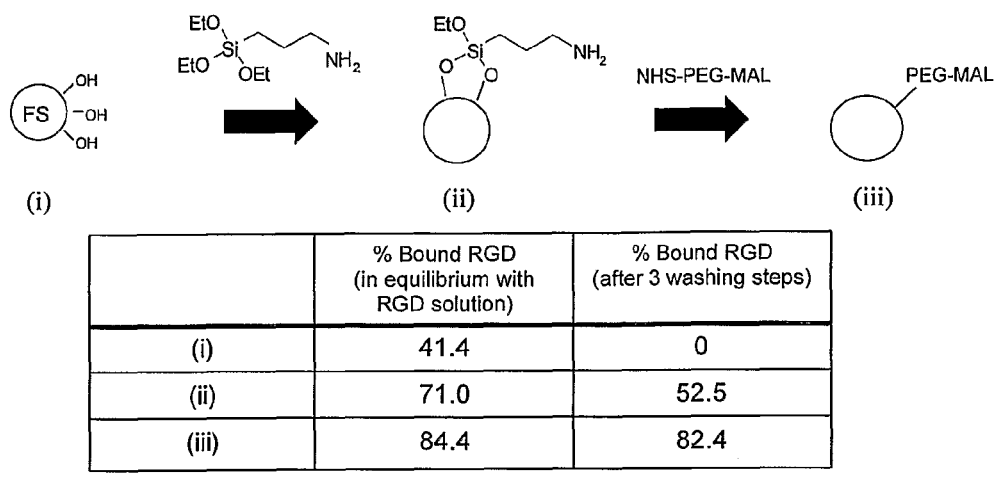
FIG. 7 shows a scheme of modification of FS with RGD peptide: (i) unmodified FS, (ii) NH$_2$-modified FS, (iii) MAL-modified FS, and a table of percentages of RGD bound to unmodified and modified FS, before and after 3 washing steps.

FS was first modified using aminopropyltriethoxysilane (APTS) so as to replace the free OH groups on fumed silica (FIG. 7(i)) with NH$_2$ groups (FIG. 7(ii)). Ligands such as RGD were then coupled to the modified fumed silica using N-hydroxysuccinimide polyethylene glycol maleimidyl (NHS-PEG-MAL) (FIG. 7(iii)). 5.25 mg of the NH$_2$-modified FS were added to a solution of NHS-PEG-MAL (3.3 mg/mL) in pH 6 sodium phosphate buffer, and the mixture was vortexed for 2 h. The reaction suspension was centrifuged at 5000 rpm for 10 min. The pellet was redispersed in 50 µL of RGD solution (1 mg/mL), and vortexed overnight. The RGD concentration in the supernatant (in equilibrium with the RGD solution) was measured using the BCA Protein Assay Kit (Pierce, Rockford, Ill.). To wash the particles with adsorbed RGD, the pellet was redispersed in 50 µL of deionized water, and centrifuged at 4000 rpm for 10 min. The supernatant RGD concentration was measured and reported as the first wash. The redispersion and centrifugation steps were repeated to obtain the supernatant RGD concentrations for the second and third washes. The percentage of bound RGD after the three washes was obtained by subtracting the combined supernatant RGD concentrations for the first, second and third washes from the concentration of bound RGD (in equilibrium with RGD solution), and expressed as a percentage of the initial RGD concentration. The results are shown in the Table of FIG. 7.

Results and Discussion

Figure 4:
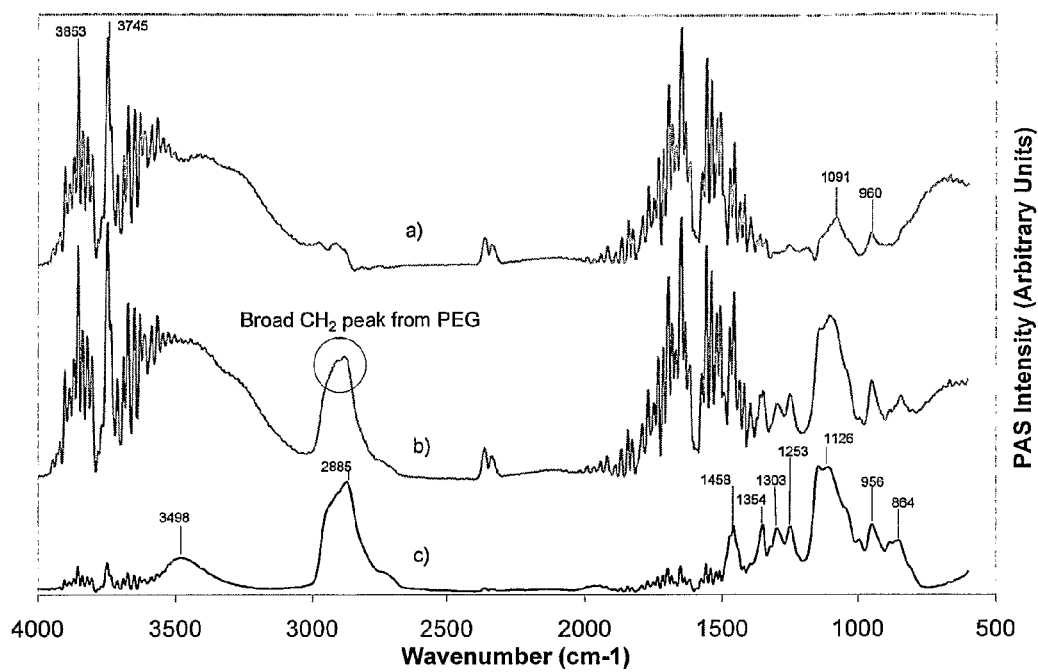
FIG. 4 shows FTIR spectra of (a) $SiO_2$ gel by base-catalyzed gelation of hydrolyzed TEOS, (b) washed and dried PEG-$SiO_2$ gel, and (c) 4-arm PEG.

Compared to the silica gel from the base-catalyzed gelation of hydrolyzed TEOS (FIG. 4a), the PEG-SiO$_2$ gel has additional FTIR peaks at 800-1500 cm$^{-1}$ and 2800-3000 cm$^{-1}$ attributed to 4-arm PEG and its CH$_2$ groups, respectively (FIG. 4b). Both samples showed FTIR peaks due to residual OH groups present in the silica (960 cm$^{-1}$ and 3500-4000 cm$^{-1}$), SiO—H stretching of free silanol groups (3745 cm$^{-1}$), and Si—O—Si stretching (1091 cm$^{-1}$).

Figure 5:
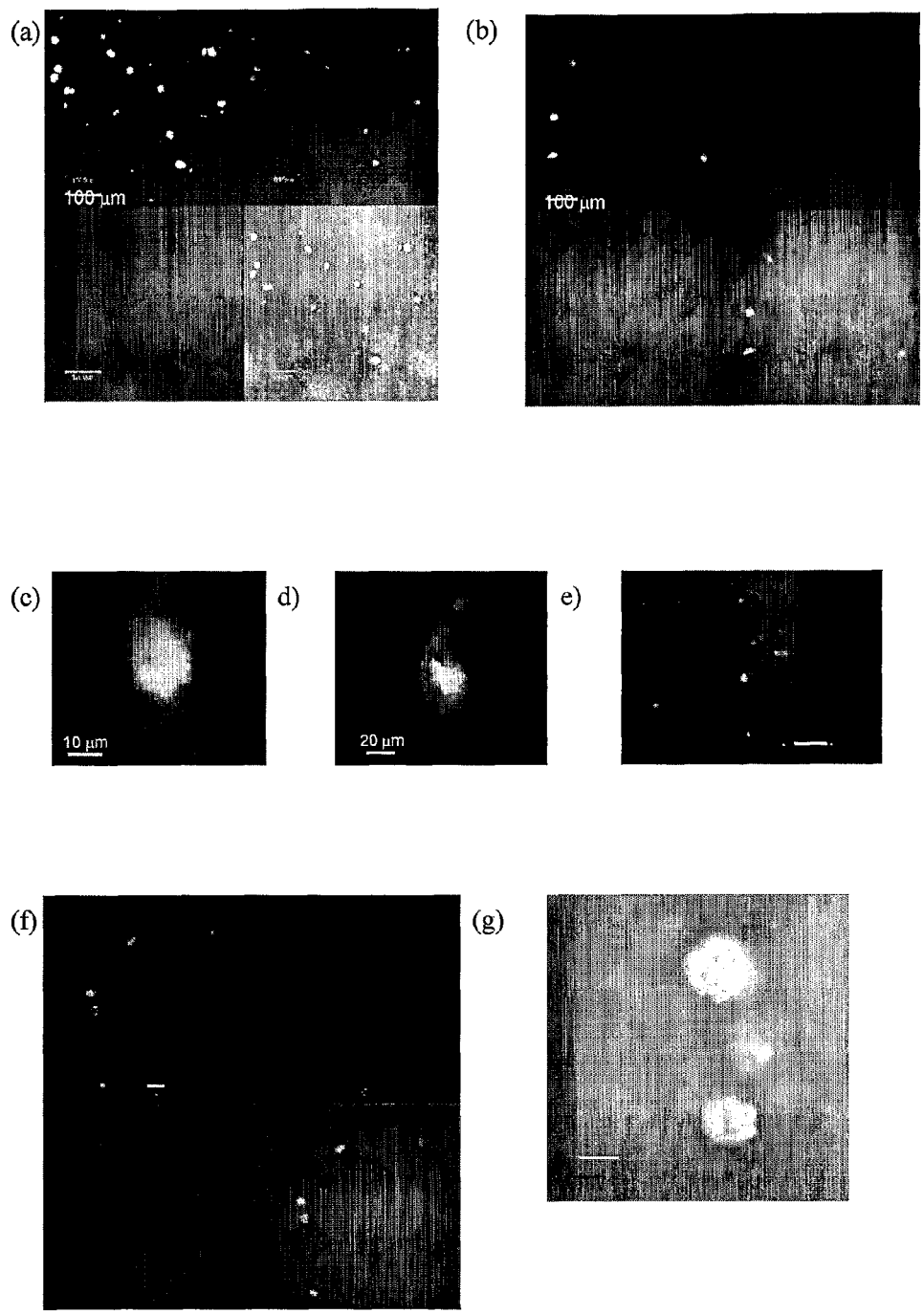
FIG. 5 shows confocal micrographs of the live-dead assay of hMSC cells that were cultured for 1 week in PEG-$SiO_2$ gels containing RGD and heparin at a molar ratio of (a,c) 1:3 and (b,d) 1:1. For comparison, MC3T3 cells were also cultured in PEG-$SiO_2$ gels (e) without and (f,g) with MC-3T3 ECM.

Live-dead assays of hMSCs on the RGD- and heparin-modified PEG-SiO$_2$ gels (FIG. 5a-d) indicated that the cells survived within the gels, indicating that the gels were sufficiently porous for gas and nutrient diffusion to the cells. The gels with higher concentrations of RGD ligands promoted greater 3-D cell spreading. The cells cultured in gels without RGD ligands also survived (FIG. 5e).

ECM isolated from cultured cells (cell lines, primary cells) provided a rich source of matrix molecules and growth factors. Incorporation of ECM into the PEG-SiO$_2$ gel would combine the favorable biological activity of the former with the processability of the latter. It was shown that the ECM isolated from an MC-3T3 cell line could be uniformly dispersed in the PEG-SiO$_2$ gel by simply vortexing for a short period of time. Subsequent separation of the ECM was prevented by the increasing viscosity of the gel. MC-3T3 cells that were cultured in the gel maintained their viability (FIGS. 5f-g).

Figure 6:
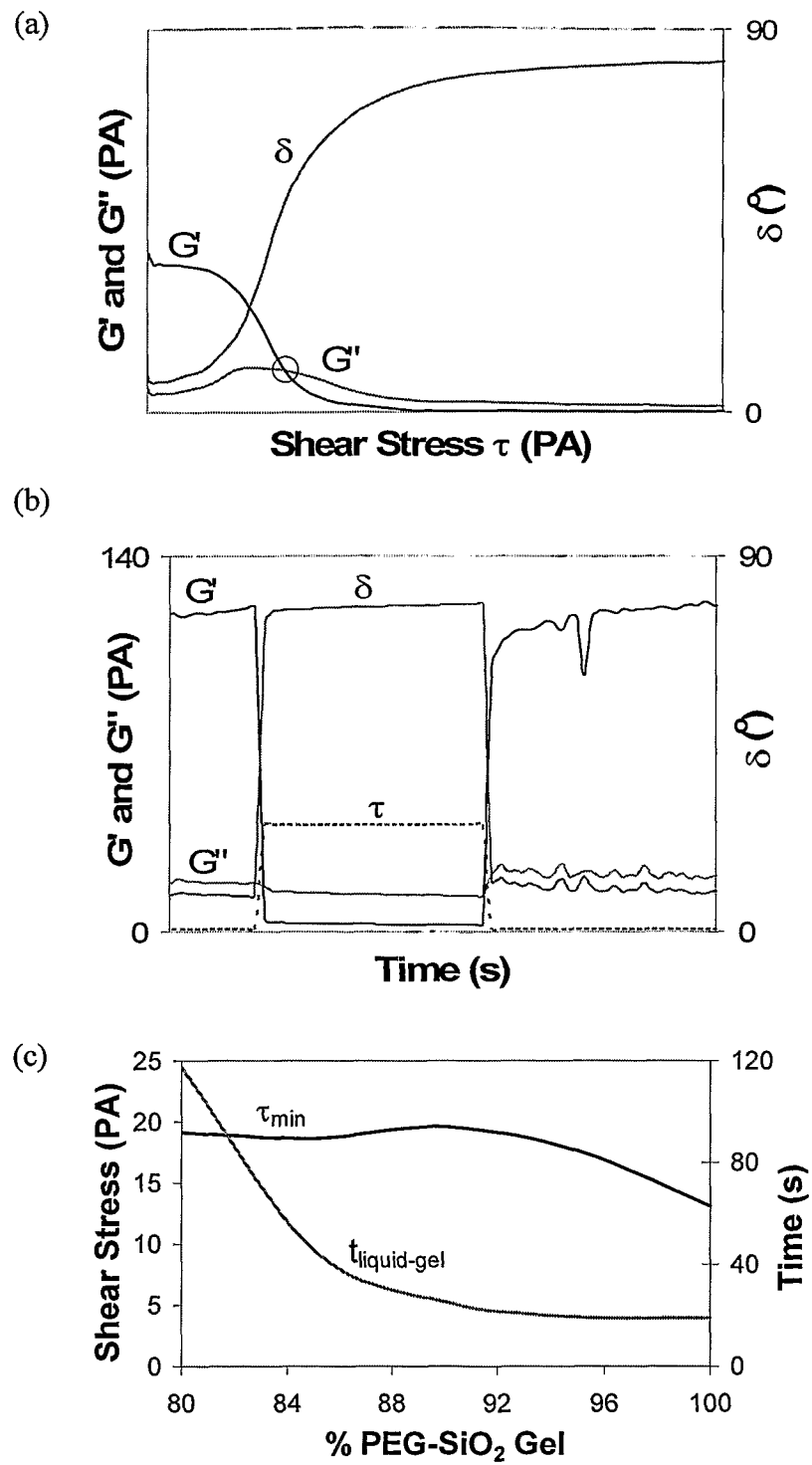
FIG. 6 shows graphs illustrating (a) typical storage modulus (G'), loss modulus (G") and $\delta$ ($\tan^{-1}(G"/G')$) of PEG-$SiO_2$ gel as a function of increasing shear stress ($\tau$) (in which the smaller $\delta$, the more viscous the material: for G'>G", the PEG-$SiO_2$ system remained in the gel form, and it became liquefied when G'<G": the minimum shear stress ($\tau_{min}$) required for gel-liquid transition was indicated by ○); (b) typical G', G" and $\delta$ of PEG-$SiO_2$ gel as a function of time when subjected to a cyclic shear stress ($\tau$): the time required for liquid-gel transition ($t_{liquid-gel}$) after removal of the shear stress was given by the period required for G', G", and $\delta$ to return to their original levels before the shear stress was applied; (c) graph of $\tau_{min}$ and $t_{liquid-gel}$ as a function of vol % PEG-$SiO_2$ gel in a mixture of PEG-$SiO_2$ gel and cell culture media.

Rheology studies confirmed that the PEG-SiO$_2$ gel has a mechanically reversible gel-liquid-gel property when subjected to on-off cyclic shear stress (FIG. 6b). There existed a minimum shear stress ($\tau_{min}$) for the gel to liquefy (FIG. 6a). There was also a minimum time required for liquid-gel transition ($T_{liquid-gel}$) after removing the shear stress. Both $\tau_{min}$ and $T_{liquid-gel}$ could be adjusted by diluting the PEG-SiO$_2$ gel with 0-20% cell culture media (see FIG. 6c). Dilution with >20% cell culture media was not recommended as this would cause the PEG-SiO$_2$ gel to lose its mechanically reversible property.

The PEG-SiO$_2$ formulation described herein provided the inert rheological platform upon which biosignals could be presented in a customized fashion, so as to favorably support the growth of desired cell types. Besides the arg-gly-asp (RGD) sequence, heparin and ECM isolated from a cell line, other cell adhesion peptides, signalling molecules, ECM components (e.g. structural proteins, proteoglycans and growth factors) and cellular sources of cytokines (e.g. platelets and transfected cell lines) could be presented on the PEG-SiO$_2$ gel.

CONCLUSIONS

The inventors have developed a gel based on 4-arm PEG and SiO$_2$ with mechanically reversible rheological properties. This gel was shown to be suitable for in vitro 3-D cell culture, and promising for tissue engineering applications. The gel was robust and porous. It was bioinert, and ligands (e.g. RGD) and/or proteins (e.g. ECM, growth factors and platelets) might be added so that the gel could more favorably support the growth of the desired cell type.

The PEG-SiO$_2$ gel demonstrated a unique property of reversible gelation. It could be liquefied when vortexed to allow ligands and cells to be added, and would reset into a gel after several minutes. Due to its liquefaction property, cells could also be passaged without trypsinization, and cellular structures and ECM could be easily harvested. Live-dead assays and confocal microscopy have indicated hMSC survival and 3-D spreading after 1 week in gels containing RGD ligands, indicating that this new material was non-toxic and supported cell growth. The biocompatibility and convenience of use of this mechanically reversible gel would greatly facilitate 3-D cell culture and fundamental studies of cell behavior in a more biologically relevant environment.

The invention claimed is:

1. A process for making a mechanically reversible gel comprising:

(a) combining a hydrophilic hydroxyl species comprising at least two hydroxyl groups per molecule with a particulate modifier; and (b) combining a silanol species comprising at least two silanol groups per molecule and the hydrophilic hydroxyl species after step (a).

2. The process of claim 1 further comprising the step of hydrolyzing a silane to form the silanol species, said silane having at least two hydrolyzable groups per molecule.

3. The process of claim 2 wherein the silane comprises a tetraalkoxysilane.

4. The process of claim 1, wherein the particulate modifier comprises fumed silica.

5. The process of claim 1, wherein the combination of the silanol species and the hydrophilic hydroxyl species has a pH and the process additionally comprises adjusting the pH to between about 6 and about 9 after the step of combining.

6. The process of claim 1 wherein the hydroxyl species comprises between 3 and 10 hydroxyl groups per molecule.

7. The process of claim 1 wherein at least two of the hydroxyl groups in each molecule are endgroups of the molecule.

8. The process of claim 1 wherein the hydroxyl species is a branched chain species.

9. The process of claim 1 wherein the hydroxyl species comprises a polyether chain.

10. A gel for culturing cells comprising hydrophilic chains comprising associative groups which can associate reversibly, wherein said groups are selected from the group consisting of OH, NH and SH, whereby the gel is capable of being converted to a liquid by application of a mechanical shear force and the liquid is capable of being converted to the gel in the absence of said mechanical shear force, said gel comprising a silanol species comprising at least two silanol groups per molecule and a hydrophilic hydroxyl species comprising at least two hydroxyl groups per molecule.

11. The gel of claim 10 additionally comprising a particulate modifier.

12. The gel of claim 11 wherein the particulate modifier comprises fumed silica.

13. The gel of claim 10 wherein the associative groups are endgroups.

14. The gel of claim 10 wherein the associative groups are derived from a silane comprising at least two hydrolyzable groups per molecule.

15. The gel of claim 14 wherein the associative groups comprise silanol groups.

16. The gel of claim 14 wherein the silane is a tetraalkoxysilane.

17. The gel of claim 10 wherein the hydrophilic chains are polyether chains.

18. The gel of claim 10 wherein the hydrophilic chains are branched.

19. The gel of claim 10 additionally comprising water.

20. The gel of claim 10, said gel containing cells and/or ECM.

21. A method for releasing cells from a gel according to claim 10, said gel comprising the cells and said method comprising: combining the gel with a liquid, and applying mechanical shear to the combined liquid and gel in order to raise the ratio of loss modulus to storage modulus of the gel to over 1 so as to form a suspension of the cells in the liquid.

22. The method of claim 21 wherein the liquid is an aqueous liquid.

23. The method of claim 21 wherein the proportion of liquid in the combined liquid and gel is greater than about 25% v/v.

24. A method for incorporating a substance into a gel comprising:

providing a gel according to claim 10; applying mechanical shear to said gel in order to raise the ratio of loss modulus to storage modulus of the gel to over 1 so as to convert the gel into a liquid; combining the liquid with the substance; and allowing the liquid to stand with mechanical shear to reduce the ratio of loss modulus to storage modulus of the liquid to below 1, to maintain it as a liquid for time for so as to allow the liquid to revert to a gel.

25. The method of claim 24 wherein the substance comprises cells and/or ECM and/or proteins and/or other molecules with biological function.

\* \* \* \* \*